US006108270A

United States Patent [19]
DePoy, II

[11] Patent Number: 6,108,270
[45] Date of Patent: Aug. 22, 2000

[54] TORPEDO SEEKER HEAD HAVING DIRECTIONAL DETECTION INDEPENDENT OF FREQUENCY

[76] Inventor: Martin L. DePoy, II, 494 E. Lake St., Cleveland, N.Y. 13042

[21] Appl. No.: 09/348,016

[22] Filed: Jul. 6, 1999

[51] Int. Cl.[7] .............................. G01S 3/80; F42B 19/01; H04R 17/00
[52] U.S. Cl. .......................... 367/124; 367/129; 367/153; 114/21.3
[58] Field of Search .................................. 367/124, 125, 367/129, 153, 118, 907; 114/21.3

[56] References Cited

U.S. PATENT DOCUMENTS

| | | |
|---|---|---|
| 3,444,508 | 5/1969 | Granfors et al. . |
| 3,603,921 | 9/1971 | Dreisbach . |
| 3,987,404 | 10/1976 | Woodruff . |
| 4,078,222 | 3/1978 | Woodruff ................................. 367/124 |
| 4,205,396 | 5/1980 | Pryor, Jr. . |
| 4,305,159 | 12/1981 | Stromswold et al. . |
| 4,308,538 | 12/1981 | Albersheim . |
| 4,372,239 | 2/1983 | Hagelberg et al. .................. 114/20 A |
| 5,253,221 | 10/1993 | Coulbourn ............................... 367/135 |
| 5,457,662 | 10/1995 | Forster . |

Primary Examiner—Ian J. Lobo
Attorney, Agent, or Firm—Rothwell, Figg, Ernst & Manbeck

[57] ABSTRACT

A torpedo seeker head for providing guidance information in three orthogonal axes is provided according to the invention. The torpedo seeker head includes three directional hydrophones, with each directional hydrophone capable of receiving an acoustic signal and generating a signal output therefrom. The three directional hydrophones are aligned with their response axes oriented substantially orthogonally, with any two directional hydrophones and respective axes defining a plane. An omni-directional hydrophone is also provided which measures a phase of a received acoustic signal. The signal outputs from the any two directional hydrophones, in conjunction with the phase from the omni-directional hydrophone are used to calculate a look angle to a target in a plane defined by the any two hydrophones, with the measurement being substantially independent of frequency. The three directional hydrophones yield look angles in three dimensions. The torpedo seeker head utilizes this information to provide guidance information to the torpedo.

17 Claims, 10 Drawing Sheets

TORPEDO SEEKER HEAD HAVING DIRECTIONAL DETECTION INDEPENDENT OF FREQUENCY

BACKGROUND OF THE INVENTION

1. Field of the Invention

The present invention relates generally to a torpedo seeker head, and more particularly to a torpedo seeker head having directional detection independent of frequency.

2. Description of the Background Art

Acoustic (sound) waves have long been used as a method of detecting objects underwater. Because acoustic waves are the type of waves that propagate best through water, they are the choice for applications such as underwater warfare. Sonar (i.e., Sound Navigation And Ranging), is an application of acoustic waves wherein direction and distance to a target may be obtained through the detection of reflected acoustic waves.

Sonar may be of two types, active or passive. Active sonar emits acoustic waves toward a target and picks up reflected waves to determine direction and distance. Passive sonar does not emit any acoustic waves, but only picks up acoustic waves emitted by the target. Passive sonar therefore has an advantage in that it is less likely to give away its own location. Passive sonar is often used when it is desired that the device not transmit any acoustic waves that might be used by the target to locate or track the emitting device, or even alert the target to the presence of the emitting device.

Sonar functions to pickup underwater acoustic waves through the use of a transducer called a hydrophone. The hydrophone is capable of converting received acoustic waves into electrical signals that can be analyzed.

Sonar has practical application in the use of guidance of unmanned weapons, such as a torpedo. A torpedo is essentially a warhead attached to a propulsion system and a guidance system. Without an effective guidance system, a torpedo is a blind missile. A sonar guidance system in the form of a seeker head is capable of detecting a target and guiding the torpedo to the target. The seeker head is capable of detecting target sound, whether it be reflected sound or sound emitted by the target (such as propulsion noise generated by the target).

Figure 1:
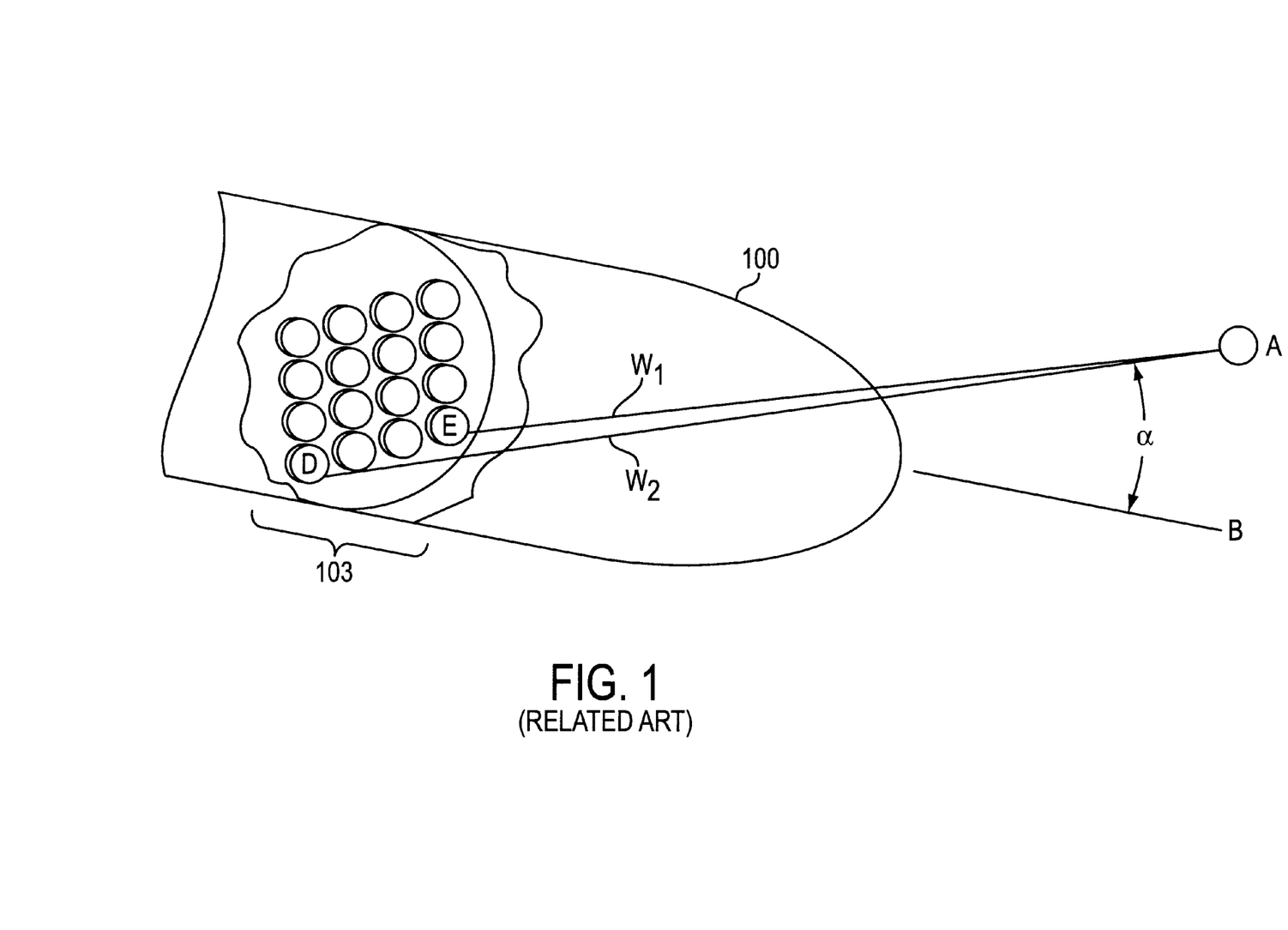
FIG. 1 shows a related art torpedo seeker head using a phase angle difference to find a look angle to a target.

The related art seeker head array is generally located in the nose area of the torpedo 100, such as shown in the related art torpedo of FIG. 1. The seeker head is commonly accompanied by amplifying and processing circuits. One example of an amplifying and processing configuration is given in U.S. Pat. No. 3,987,404 to Woodruff, incorporated herein by reference. The torpedo 100 can thereby track a target.

Multiple hydrophone elements, typically configured in an array, are used in these acoustic torpedo seeker heads to observe phase differences. Many array configurations are possible. Perhaps most common are square arrays consisting of 4 or 5 hydrophones on a side, for a total of either 16 or 25 hydrophones. FIG. 1 shows a cut-away of a typical torpedo 100, illustrating a typical hydrophone array 103 of the related art. Directional hydrophones may be used for this purpose, but the directional aspects of the hydrophones are not used in the related art torpedo seeker heads. The seeker heads known in the art use only the phase characteristic of received sound waves.

Acoustic torpedo seeker heads known in the related art observe differences in phase of the incoming acoustic signal to determine direction to the target. For example, if the phase angle of the hydrophone elements on the right-hand side of the array is ahead of the phase angle of those on the left-hand side, the seeker head calculates that the target lies to the right of the axis of the seeker head. Conversely, if the phase angle of the hydrophone elements of the left hand side, upper side, or lower side are ahead of the phase angle of the hydrophones on the opposite side of the array, the derived look angle (the discerned direction of the target relative to the axis of the torpedo) indicates that the target lies to the left, above, or below the seeker head, respectively. The greater the difference in phase angle, the greater the angle between the direction to the acoustic source and the axis of the seeker head (this angle is known as the "look angle").

Figure 2:
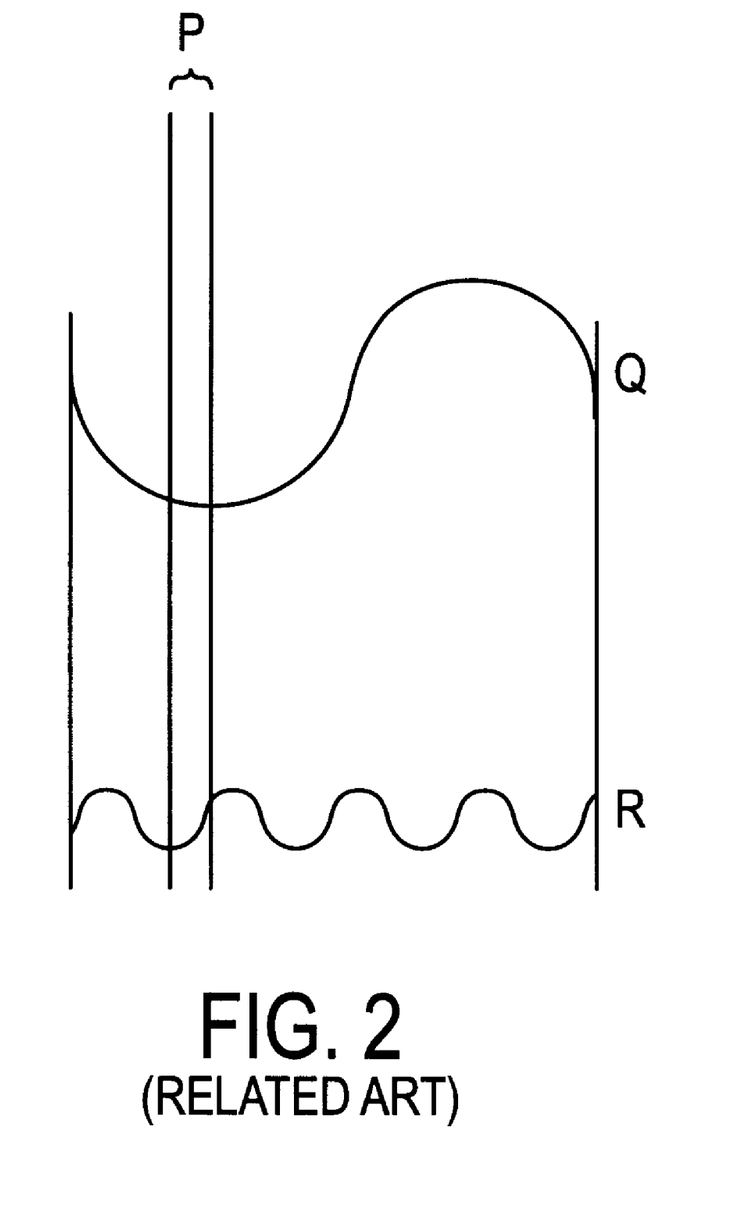
FIG. 2 shows a frequency limitation problem associated with the related art phase angle direction detection.

The use of phase differences is illustrated in FIG. 2, which shows acoustic waves of different frequencies. Wave Q is a relatively low frequency wave, while wave R is a relatively high frequency wave. It can be seen from the figure that wave R varies a significant amount of its cycle over the distance P, while wave Q does not vary significantly. Accordingly, wave R could be used to more accurately sense small distance variations of the proportion P.

From FIG. 1, it can be seen that because the acoustic wave source A is located away from the torpedo axis B, the distance to the hydrophone D is greater than the distance to the hydrophone E, so that accordingly, a phase difference exists in the waveform $W_1$ received by hydrophone E and the waveform $W_2$ received by hydrophone D. This phase difference can be used to find the look angle ∝. Ideally, in order to obtain an optimum phase difference, the hydrophones would be located far apart in order to have a measurable phase difference for lower frequency acoustic waves.

Because hydrophones in seeker heads known in the related art are relatively closely spaced due to torpedo size constraints, the use of phase differences to measure the look angle must necessarily be limited to a high frequency band. This means that if the seeker head is operating in an active mode, the carrier frequency of the emitted signal must be relatively high for good directionality to be obtained. It also means that if the seeker head is operating in the passive mode, good directionality cannot be obtained on the propulsion lines of the target acoustic signature, since propulsion lines (i.e., propeller noise, etc.), characteristically occur at low frequencies.

Therefore, the inability of related art torpedo seeker heads to reliably detect a direction to a low frequency acoustic source leads to several drawbacks. First, a related art seeker head is complex and costly to purchase and maintain. Second, the related art seeker head encounters a high characteristic of sea attenuation due to the use of high frequencies. Third, target propulsion lines usually occur at low frequencies. Fourth, torpedo ownship noise is generated at high frequencies, as the torpedo propeller blades are small and must rotate rapidly.

Torpedo seeker heads in the related art which rely on high operating frequencies have an additional drawback in that their effectiveness is further reduced by the use of anechoic coatings on targets. Anechoic coatings are coatings that tend to absorb incoming waves in order to reduce a reflected signal. Anechoic coatings are highly effective at frequencies commonly used by related art torpedo seeker heads despite the fact that they are thick, heavy, and expensive. They are much less effective at lower frequencies. Anechoic coatings are unlikely to become effective at low frequencies because of the penalty of prohibitively greater coating thickness and hence cost.

Therefore, there remains a need in the art for a torpedo seeker head having directional detection independent of frequency.

SUMMARY OF THE INVENTION

A torpedo seeker head which provides guidance information in three orthogonal axes and substantially independent of frequency is disclosed in accordance with the present invention. The torpedo seeker head comprises three directional hydrophones each of which is capable of receiving an acoustic signal and generating a signal output therefrom. Each directional hydrophone is aligned such that the response axis is oriented approximately orthogonally to the response axes of the other direction hydrophones, with any two directional hydrophones and respective axes defining a plane. The present invention further includes an omni-directional hydrophone for measuring a phase of a received acoustic signal, wherein signal outputs from the any two directional hydrophones, in conjunction with the phase from the omni-directional hydrophone are used to calculate a look angle to a target in a plane defined by the any two hydrophones, with the measurement being substantially independent of frequency. With the three directional hydrophones, the present invention yields look angles in all three orthogonal planes, thus giving direction in all three physical dimensions. Based upon this information, the torpedo seeker head provides guidance information to the torpedo.

The above and other features and advantages of the present invention will be further understood from the following description of the preferred embodiment thereof, taken in conjunction with the accompanying drawings.

DETAILED DESCRIPTION OF THE PREFERRED EMBODIMENTS

Figure 3:
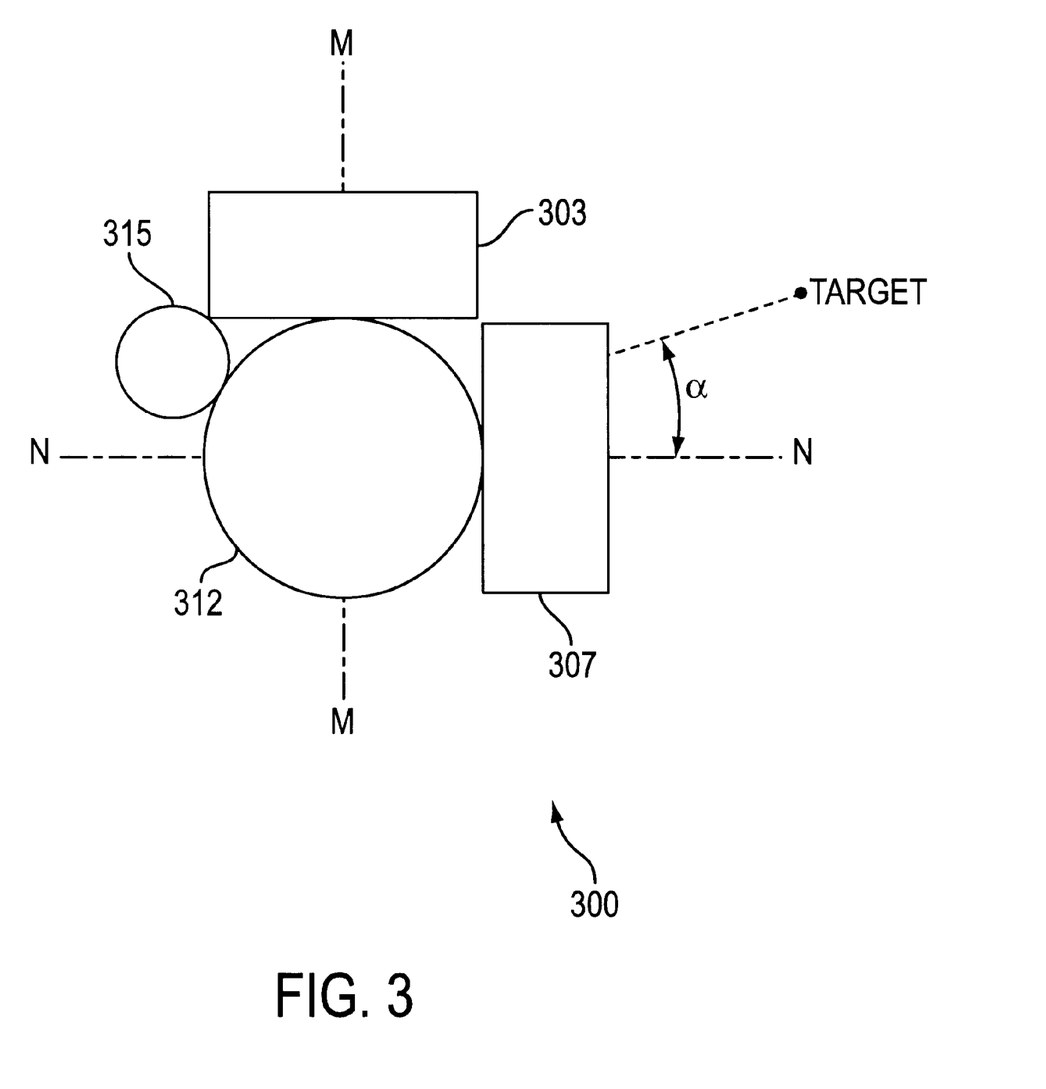
FIG. 3 shows a hydrophone cluster of the present invention having three orthogonal directional hydrophones and one omni-directional hydrophone.

FIG. 3 shows a hydrophone cluster 300 of a preferred embodiment of the present invention having three orthogonal directional hydrophones 303, 307, and 312, and one omni-directional hydrophone 315. This enables the hydrophone cluster 300 to find a target direction in three dimensions. The hydrophone cluster 300 in the preferred embodiment is located in a forward portion of a torpedo weapon, but it is also contemplated that the hydrophone cluster 300 may be employed on submarines, surface ships, and on other marine vehicles.

In the figure, hydrophone 303 has a response pattern aligned with axis M-M, hydrophone 307 has a response pattern aligned with an orthogonal axis N-N, and hydrophone 312 has a response pattern aligned with an orthogonal vertical axis coming vertically out of the figure.

Hydrophone 315 is an omni-directional hydrophone, picking up acoustic signals in all directions. The omni-directional hydrophone 315 has an approximately spherical response pattern with the hydrophone 315 being located in the center of the sphere. An acoustic signal is received by the omni-directional hydrophone 315 at a constant phase and signal strength regardless of the directional position of the acoustic signal source in relation to the omni-directional hydrophone 315.

Figure 4:
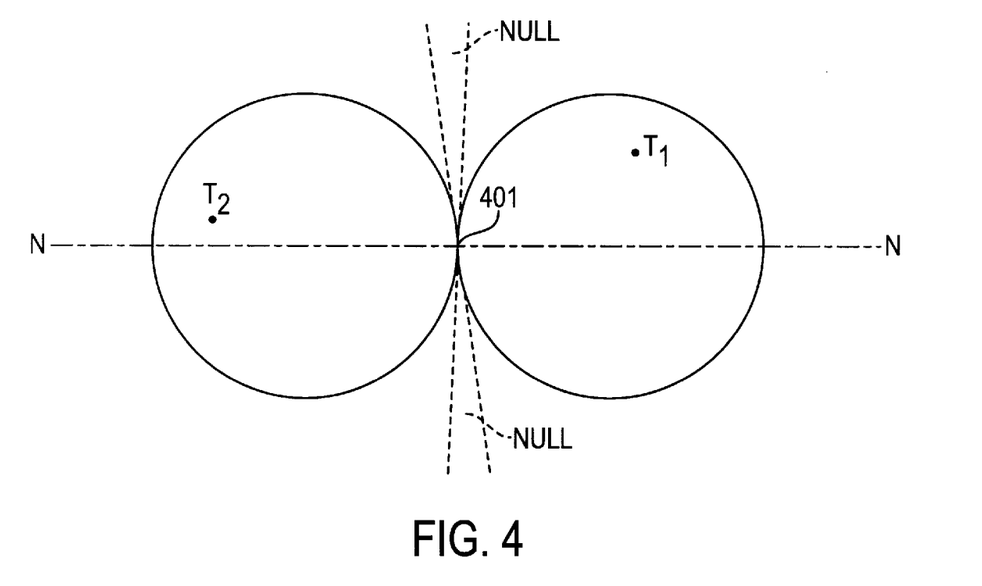
FIG. 4 shows a two-dimensional representation of a limacon response pattern for a hydrophone.

Any suitable directional response pattern may be used for the hydrophones 303, 307 and 312. In a preferred embodiment, the directional hydrophones 303, 307 and 312 have a close approximation of a limacon response pattern. FIG. 4 shows a two-dimensional representation of a limacon response pattern for a hydrophone. In three dimensions, the shape is similar to a balloon with a string tied tightly at the center of the balloon. The hydrophone is located at the confluence 401 of the limacon response pattern lobes. The limacon response pattern hydrophone picks up signals in both directions along the axis N-N. The only difference in a received signal between the left response pattern lobe and the right response pattern lobe is a 180 degree phase shift in received signals between the two lobes.

In accordance with the present invention, a look angle $\propto$ in a plane defined by any two hydrophones may be found by combining the outputs from two of the three hydrophones and using a phase from the omni-directional hydrophone 315. By using appropriate combinations of hydrophone pairs, look angles in all three dimensions may be found. The resulting look angles may be used to guide a torpedo or other such marine vehicle. For example, hydrophones 303 and 307 may be used to find the look angle in the plane of the paper (discussed below).

Figure 5:
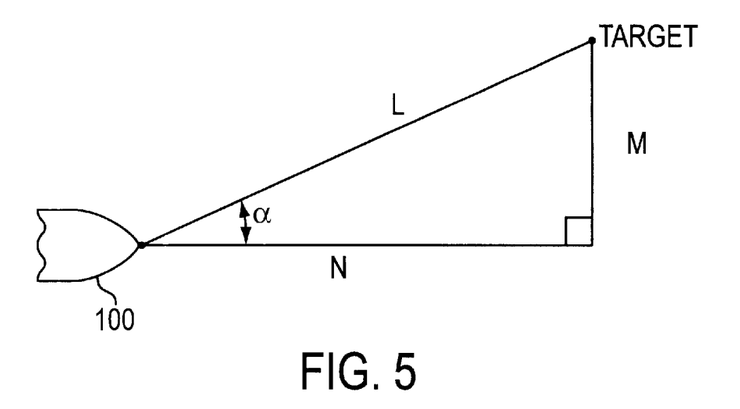
FIG. 5 is a diagram showing how a look angle $\propto$ is determined.

FIG. 5 is a diagram illustrating how the look angle $\propto$ is preferably determined. In the diagram, hydrophone 303 in the torpedo seeker head 100 picks up a signal M and the hydrophone 307 picks up a signal N. These two responses may be used to calculate the look angle $\propto$ in the defined plane. The signal M is represented by:

$$M = f(t)\sin\propto \tag{1}$$

where M is the received signal strength at directional hydrophone 303, and where f(t) is the strength of the acoustic signal at the seeker head 100. The acoustic signal f(t) is reduced by the factor $\sin\propto$ due to the directionality of the hydrophone.

Because hydrophone 307 is orthogonal to hydrophone 303, the signal N is represented by:

$$N = f(t)\cos\propto \tag{2}$$

For a right triangle, the tangent is defined as:

$$\tan \alpha = \text{opposite/adjacent} = M/N \quad (3)$$

This formula can be rearranged into the form:

$$\alpha = \text{inverse tangent } (M/N) \quad (4)$$

Therefore, in this example, the look angle $\alpha$ from the axis N-N can be found by taking the inverse tangent of the received signal strength M from hydrophone 303 divided by the received signal strength N from the hydrophone 307. Other algorithms, also included in this invention, may be used to derive the same output information from this input information; this is one of the simplest, and is preferred.

While the above formulas can be used to calculate a look angle $\alpha$, the direction from which the look angle is measured also must be determined. This is because for example, in the preferred embodiment (i.e., a limacon response pattern), the received signal at each of the two hydrophones is a signal having a magnitude but no direction.

Figure 6:
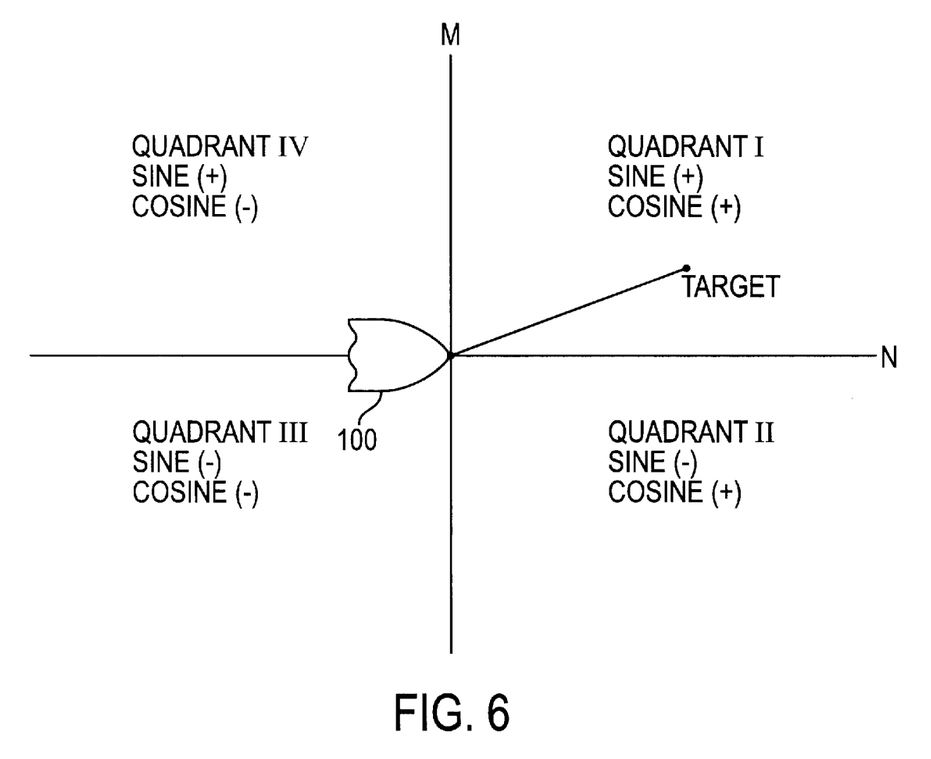
FIG. 6 is a diagram of the quadrants defined by a pair of directional hydrophones.

FIG. 6 is a two-dimensional quadrant illustrating that the values of M and N may fall in any one of the four quadrants. Therefore, additional information is needed in order to place the look angle $\alpha$ in the correct quadrant.

Electrically, the phase of the signals detected by the omni-directional hydrophone 315 do not vary with the direction of arrival, whereas the phase of the signals detected by the limacon directional hydrophones 303, 307, and 312 do vary with direction. Therefore, if the axis of a limacon directional hydrophone is rotated by 180 degrees, the apparent phase of a signal from a stationary signal source will reverse as the null of the limacon hydrophone response pattern rotates past the direction of the signal source.

For a directional hydrophone, a received signal may have originated in either the left or the right lobe (see FIG. 4). Because the only difference between the two lobes is a 180 degree phase shift, the appropriate lobe may be determined by detecting whether the phase of the directional hydrophone is in phase with the signal from the omni-directional hydrophone. The omni-directional hydrophone provides this information. Initially, one lobe of the response pattern of each directional hydrophone is assigned to be the "positive" lobe (either lobe may be assigned to be the positive lobe). If the phase of the omni-directional hydrophone 315 and the received signal of the directional hydrophone match, then the received signal may be assigned a positive sign. For example, assuming that the phase of a directional hydrophone response from a target signal $T_1$ matches the phase of the omni-directional hydrophone 315 (see FIG. 4), a positive sign may be arbitrarily assigned, while correspondingly, if the phase of the directional hydrophone response from target signal $T_2$ matches the phase of the omni-directional hydrophone, a negative sign would be assigned.

The directional hydrophones may therefore be used to find look angles in all three orthogonal axes, and the torpedo or other marine vehicle may therefore be steered by use of the look angles calculated from the algorithms described above or from other equivalent algorithms.

The outputs from the three directional hydrophones and the omni-directional hydrophone are pre-processed and then input into a digital processor or other computer. The pre-processing may include a pre-amplifier for amplifying a signal from a hydrophone, a sample-and-hold to periodically capture an analog signal level for conversion to a digital signal, and an analog-to-digital converter for converting the sampled analog signals into digital signals, one for each hydrophone. The processor may then use the digital signals from each hydrophone in an angle determination algorithm as previously discussed to find both a left-right steering angle and an up-down steering angle. The processor may then move a set of horizontal steering fins and a set of vertical steering fins in response to the determined steering angles. The torpedo or other marine vehicle may thereby be guided to a target.

In an alternate embodiment of the present invention, the hydrophone cluster 300 may contain only two directional hydrophones and an omni-directional hydrophone, enabling a target direction to be found in two dimensions. However, this embodiment may require a direction finding device, or devices, such as a compass, in order to guide a torpedo to a target. For example, in this alternate embodiment, two orthogonal directional hydrophones are used in conjunction with an omni-directional hydrophone and a directional phase-shifting compass. The two directional hydrophones are at right angles to each other in the horizontal plane. This would in appearance be similar to FIG. 3, but without hydrophone 312, for example. The directional phase-shifting compass is used to determine a direction with respect to magnetic North. The signals out of the two directional hydrophones are the same as in the above algorithm, namely:

$$A = f(t)\cos(\alpha) \quad (5)$$

$$B = f(t)\sin(\alpha) \quad (6)$$

where f(t) is again the strength of the acoustic signal at the seeker head. A separate signal cos(b(t)) is generated and input to the phase shifting compass such that the output of the phase shifting compass is cos[b(t)+(c)], where (c) is the angle between true North and the axis of the cosine sensor. The signal is also shifted by 90 degrees of phase such that an output of sin[b(t)+(c)] is also produced. The cosine sensor signal is then multiplied by the non-phase shifted compass signal, producing:

$$A' = f(t)\cos(\alpha)\sin[b(t)+(c)] \quad (7)$$

$$B' = f(t)\sin(\alpha)\cos[b(t)+(c)] \quad (8)$$

When A' and B' are summed, they produce:

$$A'+B' = f(t)\cos(\alpha)\sin[b(t)+(c)]+f(t)\sin(\alpha)\cos[b(t)+(c)] \quad (9)$$

Using the rule that:

$$\sin(A+B) = \sin(A)\cos(B)+\cos(A)\sin(B) \quad (10)$$

the expression A'+B' can be simplified to:

$$A'+B' = f(t)\sin[(\alpha)+b(t)+(c)] \quad (11)$$

This produces a sine wave b(t) which is amplitude modulated by the incoming acoustic signal f(t), phase shifted by the compass angle (c), and also phase shifted by the direction angle ($\alpha$) of the signal source by the cosine sensor. From this, in conjunction with the original non-phase shifted compass signal, the compass angle can be determined. By subtracting the compass angle from the total phase shift, the angle to the acoustic source can be determined using the cosine sensor.

The method of determining the phase shift is simple. The seeker head merely observes the time at which the sine wave crosses zero, i.e., the time when the sign bit changes, as opposed to the time when the unshifted sign bit changes.

It should be understood that other ways of deriving the look angle may be used in the seeker head of the present invention, and fall within the scope of the present invention.

Figure 7:
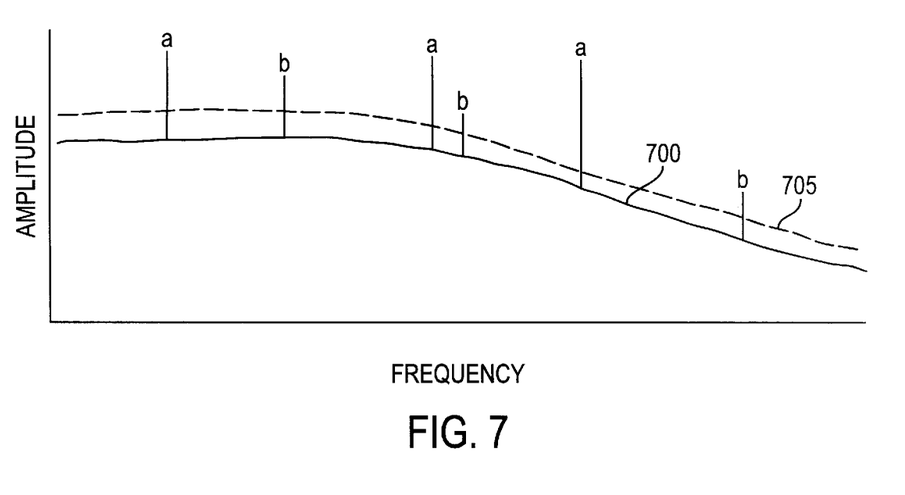
FIG. 7 is a non-discriminated frequency spectrum graph showing a plurality of frequency components of one or more acoustic signals.

FIG. 7 shows a display commonly known as an ALIU. This is an acronym for Automatic Line Integration, Unthresholded. The ALIU is a representation of a spectral analysis of a acoustic signal (i.e., a frequency spectrum graph). The vertical axis of the ALIU represents the amplitude of the received signal, while the horizontal axis represents frequency. The line 700 is a representation of a typical noise spectrum. The vertical lines along the spectrum are signal frequency components of one or more acoustic signals. The dashed line 705 above the noise spectrum is an artificial threshold level which is commonly set above the ambient noise level at any particular frequency. The threshold level may be used to reject acoustic signals that do not attain a desired amplitude.

Figure 8:
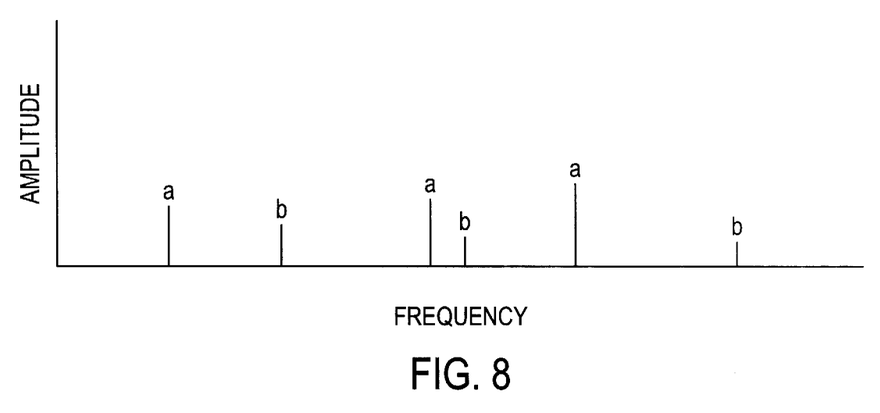
FIG. 8 shows the frequency spectrum graph of FIG. 7 after thresholding.

FIG. 8 shows the same spectrum after thresholding. This display is commonly called an ALIT, which is an acronym for Automatic Line Integration, Thresholded. As can be seen from the figure, the signal below the threshold is removed, leaving only signal frequency components above the threshold. Readability of the frequency spectrum graph is improved by the thresholding process.

As a separate type of processing, the seeker head may subject all received signals to directional analysis. If there are, for instance, two acoustic signals, and if there is no interference between the two signals, then directional analysis will show one group of spectral lines in one direction and a second group of spectral lines in another direction. But, if there is interference between some of the lines of the two signals, directional analysis of those interfering lines may erroneously report the source of that line to be a single source in a third direction. If that is suspected to be happening, one of the sources may be selected for discrimination. Depending on the degree of angular separation between the two acoustic sources, as explained below, either a steered limacon or a steered cardioid pattern may be selected for discriminatory use, and the null of the pattern steered toward the offending acoustic source. This of course does not guarantee that the non-discriminated against acoustic source will be perfectly or satisfactorily received, but the discrimination may help to resolve the desired acoustic source. Hydrophone response pattern steering is discussed below in conjunction with FIGS. 11–13.

Figure 9:
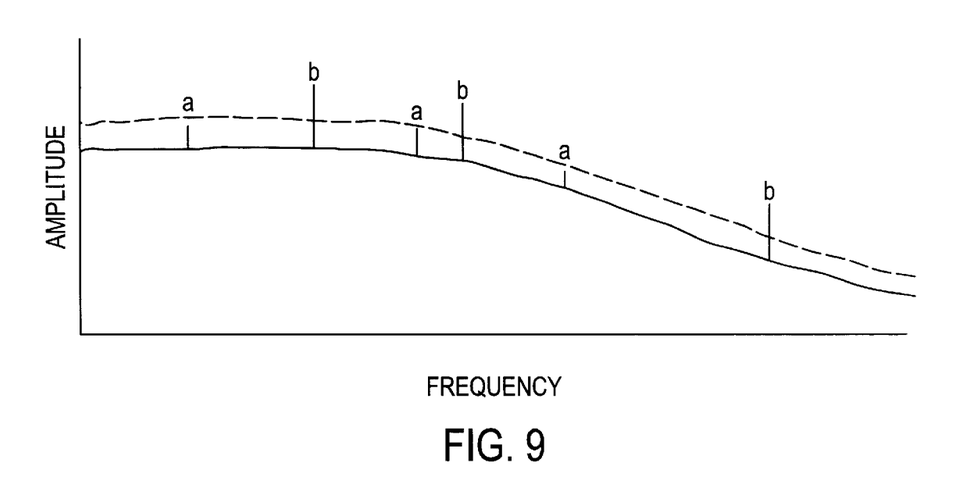
FIG. 9 shows a frequency spectrum graph for a cardioid response directional hydrophone cluster wherein the cardioid has been steered away from one acoustic source and toward another.

FIG. 9 shows the result of steering a cardioid null toward the acoustic signal source (a) of FIG. 7. The signal frequency component lines of source (a) have been reduced in amplitude to a point where they no longer exceed the threshold and can be ignored. If the offending acoustic signal is a noise source which is masking some of the signature lines of the desired acoustic signal, pointing a null of a response pattern of the hydrophone cluster 300 at the noise source will reduce the noise level of the omni-directional hydrophone 315, making the signature more easily identifiable. The nulled pattern chosen (e.g., cardioid or limacon) would be used wherever the omni-directional pattern would otherwise be used.

Figure 10:
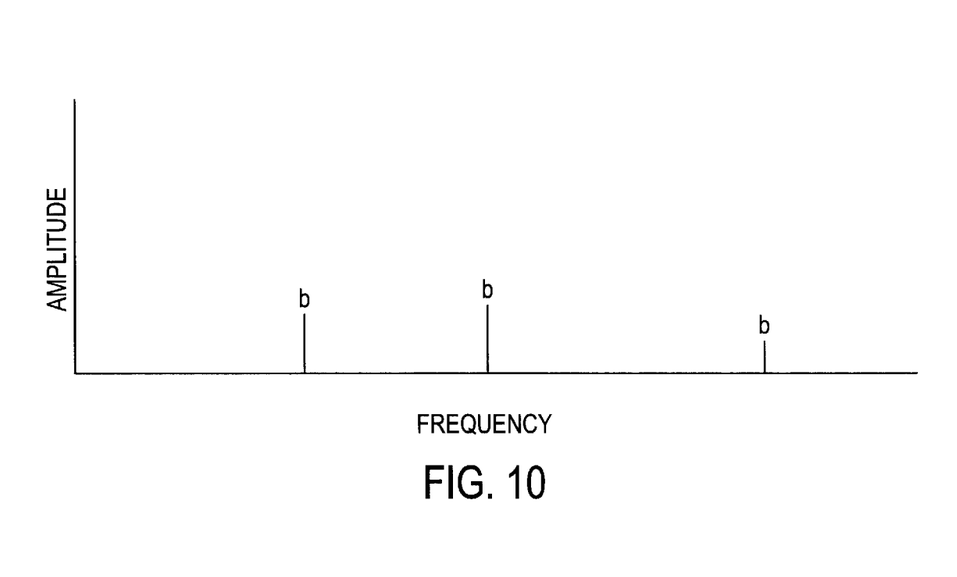
FIG. 10 shows the frequency spectrum graph of FIG. 9 after thresholding.

FIG. 10 is a frequency spectrum graph of a thresholded signal that simultaneously employs a steered response pattern. As discussed in relation to FIG. 9, the null of the hydrophone response pattern may be steered in the direction of an unwanted or offending acoustic signal source. The torpedo seeker head may take advantage of the fact that, with modern high speed computing techniques, repeated analysis of the same set of data is feasible. Accordingly, repeated iterative directional analyses of the same data would scan a null of a hydrophone response pattern past all acoustic sources. This may result in a plurality of nulls or attenuations; one for each acoustic source. As a result of steering a response pattern null toward an acoustic source, the acoustic source may suffer a complete loss of signal (i.e., a nulling out of the signal), or it may result in a less than complete attenuation of the signal.

Often as part of signal processing it is desired to null out a source of interference. For this purpose both steered limacon and steered cardioid response patterns are available through processing techniques. The steered limacon pattern is preferred if the noise source is to the side of the target signal, while the steered cardioid is preferred if the noise source is generally in an opposite direction from the target signal.

Figure 11A:
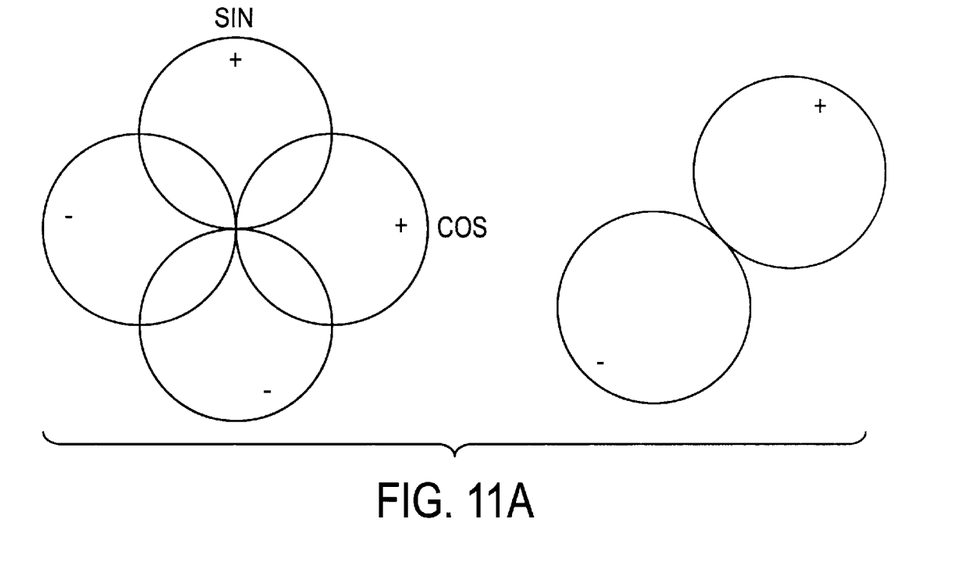
FIGS. 11A and 11B show how a limacon response pattern may be steered.
Figure 11B:
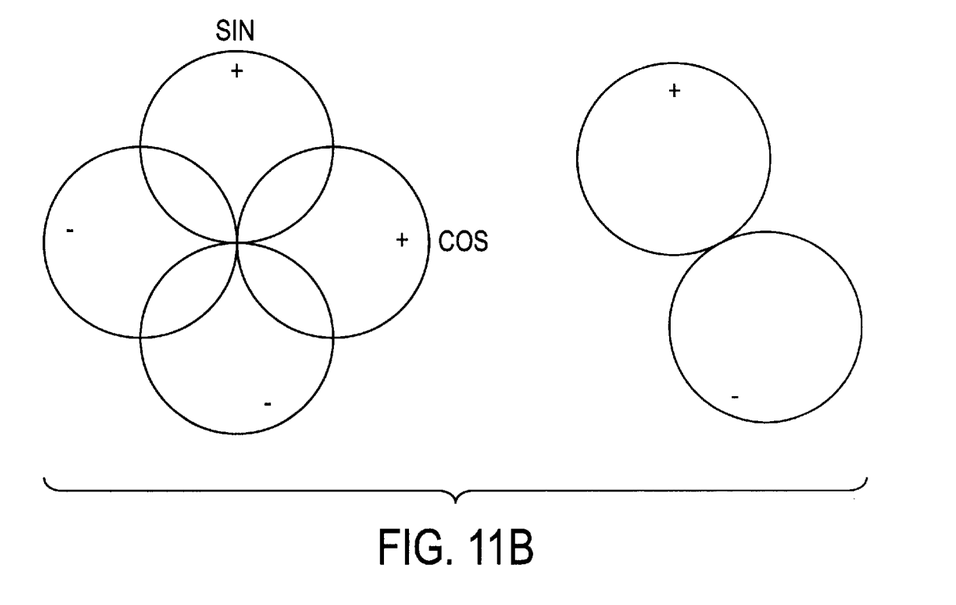

Generation of the steered limacon response pattern takes advantage of the fact that there are two limacon directional hydrophones approximately at right angles. The limacon is steered by taking a weighted, signed sum of the two received directional signals, as shown in FIGS. 11A and 11B. The left hand portions of FIGS. 11A and 11B show the limacons of the two directional hydrophones in a two dimensional system. The resultant limacon is steered by taking a weighted, algebraic sum of the limacons from the two directional hydrophones. The steered signal D from the steered limacon is given by:

$$D=f(t)((d)\cos(\alpha)+(e)\sin(\alpha)) \qquad (12)$$

where (d) and (e) are weighting constants such that:

$$(d)=\cos(b) \qquad (13)$$

and $$(e)=\sin(b) \qquad (14)$$

where b is the desired pointing angle of the limacon.

The right hand portion of FIG. 11A shows the resultant limacon steered through an angle of 45 degrees, i.e., (d)=cos(45 degrees)=+0.707, and (e)=sin(45 degrees)=+0.707.

The right hand portion of FIG. 11B shows the resultant limacon steered through an angle of 120 degrees, i.e., (d)=cos(120 degrees)=−0.5, and (e)=sin(120 degrees)=+0.866. The resultant limacon may then be algebraically added to the omni-directional pattern to form a steered cardioid.

Figure 12:
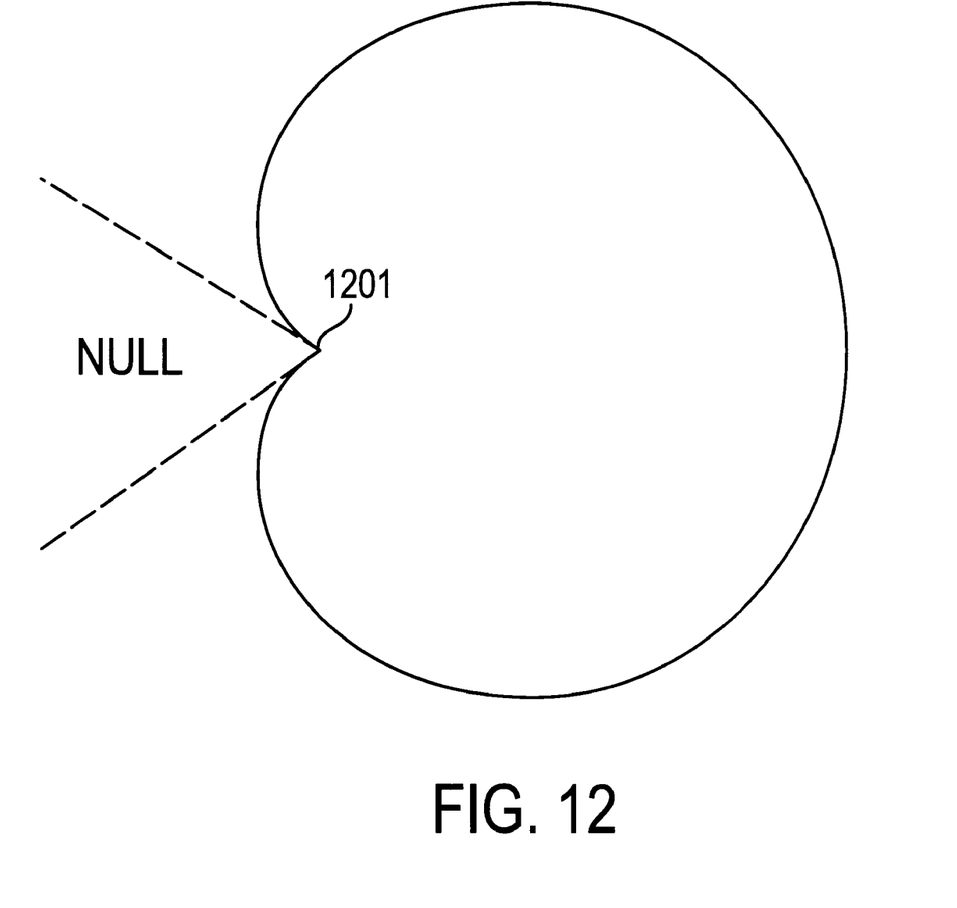
FIG. 12 shows a two-dimensional representation of a cardioid response pattern for a hydrophone.

FIG. 12 shows a two-dimensional representation of a cardioid response pattern for a hydrophone cluster. In three dimensions, the shape resembles a dimpled sphere. The hydrophone cluster is located at the cusp 1201 of the cardioid response pattern. The null of the cardioid pattern is the area to the left of the hydrophone cluster and hydrophone cluster response pattern where no signal is picked up. The cardioid response pattern is directional in that a target directly in front of a cardioid hydrophone cluster will generate the largest signal in the hydrophone cluster, and the signal will drop off (attenuate) as the hydrophone cluster is rotated away from the target. If the hydrophone cluster is rotated so that the null area is pointed toward the target, ideally the hydrophone cluster will not pick up any signal.

Figure 13:
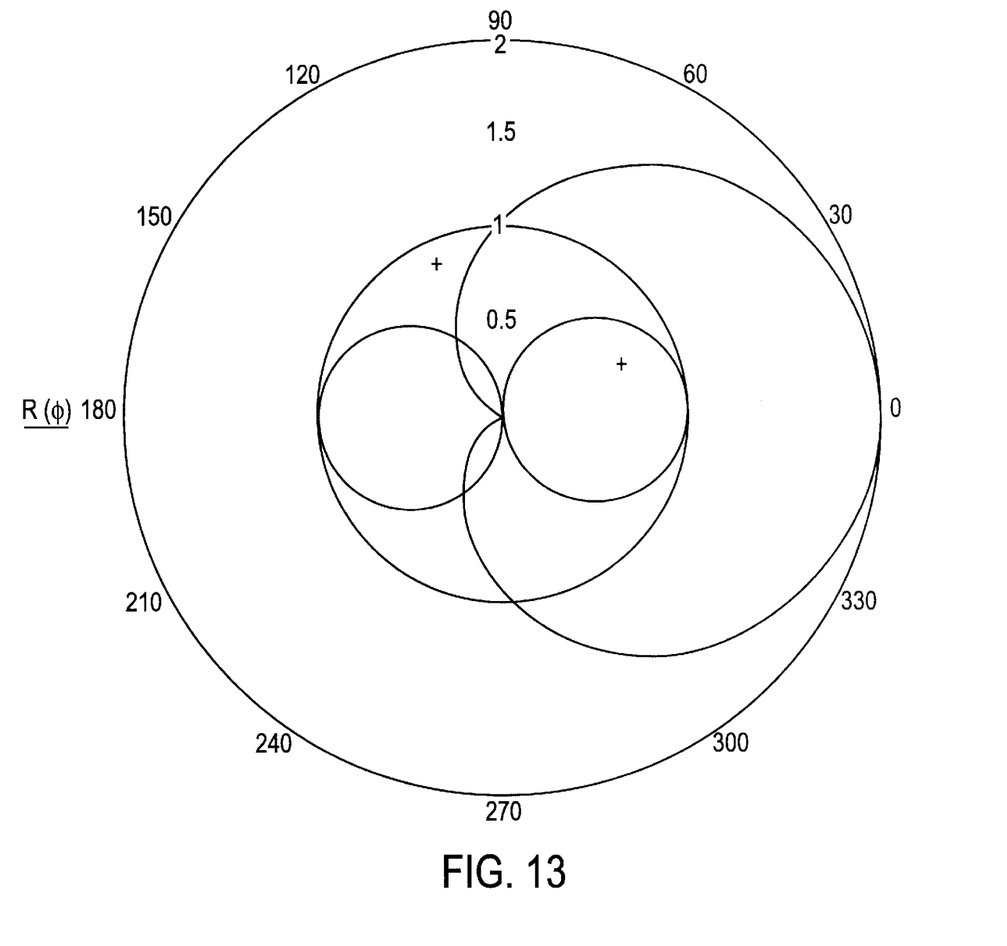
FIG. 13 shows how a cardioid response pattern is formed.

The directional hydrophones 303, 307 and 312 may form a cardioid response pattern by the algebraic addition of an omni-directional pattern and any limacon pattern of a directional hydrophone. FIG. 13 shows how the cardioid response pattern is formed from the limacon pattern of the directional hydrophones and the pattern of the omni-directional hydrophone. Every limacon pattern resulting from the weighted addition of the limacons from the directional hydrophones has both positive and negative lobes, as illustrated. It follows that when the limacon and omni-directional patterns are added algebraically, the addition swells the resulting pattern in the direction of the positive limacon lobe, and contracts the pattern in the direction of the negative lobe, thus forming a cardioid, as illustrated. The larger circle of FIG. 13 represents twice the gain of the omni-directional hydrophone, which is the maximum gain supplied by the cardioid.

The mathematical expression for a cardioid is "(1+cos(a))", where the "1" expresses the response pattern of the omni-directional hydrophone, in that it expresses a uniform response in all directions, and the term "cos(a)" is the limacon response, where "a" is the angle of the acoustic source from the maximum response axis of the directional hydrophone being used. The cardioid response pattern may be formed by the algebraic addition of the omni-directional pattern and any of the limacon response patterns, including limacons which are formed and steered by weighted algebraic additions of the fixed limacon patterns.

It is considered that the invention as discussed above may have several alternate embodiments. In a first alternate embodiment, in either a two or three dimensional version (i.e., a seeker head having either two or three directional hydrophones), the seeker head may use the summation of the signals from the directional hydrophones in lieu of the signal from an omni-directional hydrophone.

In a second alternate embodiment, the hydrophones may be used to form a cardioid response pattern that may be mathematically pointed in a direction away from a target, and used to discriminate against noise sources.

In a third alternate embodiment, the cardioid response pattern null may be mathematically rotated about: 1) the torpedo axis, 2) about the line of sight to the target, or 3) about some other axis. In this variation, the orientation of the strongest detected signal with respect to the cardioid null and the torpedo axis could be used to derive the target direction with respect to the torpedo axis.

In a fourth alternate embodiment, rotating or nutating directional hydrophones may be used. Rotating directional hydrophones can be used in torpedo seeker heads in a fashion analogous to the use of directional antennas in a missile seeker head. In this embodiment the cluster of one or more directional hydrophones, with their respective response patterns, would be physically rotated about: 1) the torpedo axis, 2) about the line of sight to the target, or 3) about some other axis. Necessarily, one or more of the hydrophone response patterns would not coincide with the axis of rotation. Then the orientation of the strongest detected signal with respect to the direction of the axis of rotation and the torpedo axis could be used to derive the target direction with respect to the torpedo axis.

In a fifth alternate embodiment, a three dimensional cardioid with a fixed orientation toward the aft end of the torpedo may be provided in order to counteract the known presence of a strong on-board noise source (i.e., ownship noise).

Other means of suppression of the effects of ownship noise are available and may be used. These include determining the signature of ownship noise experimentally by observing the number of ownship screw turns per unit time. Thereafter the spectral lines of ownship acoustic signature can be ignored. There may also be reverberations from ownship noise components off of the surface and/or the bottom, etc. These will be doppler shifted by a known amount depending on the direction of the reflecting object, whether that be the surface, the bottom, or whatever, and depending on ownship speed. Therefore, the reverberations may be recognized by frequency and ignored.

The invention as discussed above has several advantages over the related art. First, the ability of the directional hydrophones of the present invention does not fall off at lower sonar frequencies. Therefore, the present invention calculates a direction to a target independent of frequency. Second, the seeker head is simplified and may be formed of fewer components, lowering initial and maintenance costs and increasing reliability. Third, the seeker head has a lower characteristic of sea attenuation, as a low frequency acoustic signal suffers less attenuation. Fourth, lower frequencies are where target propulsion lines mainly are. Target propulsion lines mainly are at lower frequencies (i.e., shaft lines, blade lines, and all other associated propulsion machinery noises). Fifth, lower frequencies are where torpedo ownship propulsion noises typically are not. A torpedo generates noise, but generally at higher frequencies, as the torpedo propeller blades are small and must rotate rapidly. Sixth, and probably the most important, is that lower frequencies are where anechoic coatings are least effective.

While the invention has been described in detail above, the invention is not intended to be limited to the specific embodiments as described. It is evident that those skilled in the art may now make numerous uses and modifications of and departures from the specific embodiments described herein without departing from the inventive concepts.

What is claimed is:

1. A torpedo seeker head for providing guidance information to a torpedo which is substantially independent of the frequency of a received acoustic signal, comprising:

a first, second and third directional hydrophone, each said first, second and third directional hydrophone being capable of receiving an acoustic signal and generating a signal output therefrom, said first, second and third directional hydrophones being aligned substantially orthogonally, with any two directional hydrophones and their respective axes defining a plane;

an omni-directional hydrophone for measuring a phase of a received acoustic signal;

means for calculating look angles to a target in three dimensions from said three directional hydrophones and said omni-directional hydrophone; and means for guiding said torpedo utilizing said calculated look angles.

2. The torpedo seeker head of claim 1, wherein said means for calculating said look angles comprises means for using signal outputs from any two directional hydrophones and said phase from said omni-directional hydrophone to calculate a look angle to the target in a plane defined by said any two hydrophones.

3. The torpedo seeker head of claim 2, wherein said seeker head selects a first and second hydrophones of the three directional hydrophones in order to calculate a look angle in a defined plane, and wherein said look angle from the axis of said first hydrophone is determined by an inverse tangent of the strength of a received signal of said first hydrophone divided by the strength of a received signal of said second hydrophone.

4. The torpedo seeker head of claim 1, wherein said three directional hydrophones have a substantially limacon response pattern.

5. The torpedo seeker head of claim 1, wherein an omni-directional response pattern of said omni-directional hydrophone is algebraically added to a response pattern of a directional hydrophone of said first, second and third hydrophones to form a substantially cardioid-shaped response pattern.

6. The torpedo seeker head of claim 1, wherein an acoustic signature of said torpedo is compensated for by said seeker head.

7. The torpedo seeker head of claim 1, wherein an acoustic signature of a launching vehicle is compensated for by said seeker head.

8. The torpedo seeker head of claim 1, wherein said three directional hydrophones are alternately used to locate a target and to locate a noise source.

9. The torpedo seeker head of claim 1, wherein said omni-directional hydrophone is used to determine a quadrant in which said look angle resides.

10. The torpedo seeker head of claim 1, wherein said omni-directional hydrophone is used to determine a quadrant in which said look angle resides by comparing an omni-directional hydrophone phase angle to a directional hydrophone phase angle.

11. The torpedo seeker head of claim 1, wherein said torpedo seeker head is less affected by an anechoic coating on a target vehicle.

12. The torpedo seeker head of claim 1, wherein said guidance information provided by said torpedo seeker head is thresholded to remove a background noise spectrum.

13. The torpedo seeker head of claim 1, wherein signal outputs from said three directional hydrophones are combined to steer response patterns of a combination of said three directional hydrophones relative to a torpedo axis.

14. The torpedo seeker head of claim 1, wherein signal outputs from said three directional hydrophones are steered away from an acoustic signal source.

15. A method for providing guidance information from a torpedo seeker head to a torpedo which is substantially independent of the frequency of a received acoustic signal, comprising:

providing a first, second and third directional hydrophone, each said first, second and third directional hydrophone being capable of receiving an acoustic signal and generating a signal output therefrom, said first, second and third directional hydrophones being aligned substantially orthogonally, with any two directional hydrophones and their respective axes defining a plane;

providing an omni-directional hydrophone for measuring a phase of a received acoustic signal;

calculating look angles to a target in three orthogonal dimensions from said three directional hydrophones and said omni-directional hydrophone; and guiding said torpedo utilizing said calculated look angles.

16. The method of providing information from a torpedo seeker head of claim 15, further comprising using signal outputs from any two directional hydrophones and said phase from said omni-directional hydrophone to calculate a look angle to the target in a plane defined by said any two hydrophones.

17. The method of providing information from a torpedo seeker head of claim 16, further comprising selecting a first and a second hydrophone of the three directional hydrophones in order to calculate a look angle in a defined plane, and determining said look angle from the axis of said first hydrophone by using an inverse tangent of the strength of a received signal of said first hydrophone divided by the strength of a received signal of said second hydrophone.

* * * * *